United States Patent [19]
Hirai

[11] Patent Number: 5,892,519
[45] Date of Patent: Apr. 6, 1999

[54] INFORMATION DISPLAY DEVICE FOR DISPLAYING VARIATION OF ENVIRONMENT

[75] Inventor: Takahiro Hirai, Chiba, Japan

[73] Assignee: Sony Corporation, Japan

[21] Appl. No.: 654,547

[22] Filed: May 29, 1996

[30] Foreign Application Priority Data

Jun. 9, 1995 [JP] Japan ................ P07-167146

[51] Int. Cl.[6] .................................................. G06T 13/00
[52] U.S. Cl. .......................... 345/440; 345/302; 345/334
[58] Field of Search ............................. 395/119, 129, 395/133, 140, 141, 806, 334; 434/2, 6; 364/420; 345/419, 429, 433, 440, 441, 302, 334

[56] References Cited

U.S. PATENT DOCUMENTS

5,740,549 4/1998 Reilly et al. ......................... 705/14

*Primary Examiner*—Stephen S. Hong
*Attorney, Agent, or Firm*—Ronald P. Kananen; Rader, Fishman & Grauer

[57] ABSTRACT

An information display device includes a display, a detector for detecting an environmental variation around a place at which the device is mounted, and a detector for detecting date and time information, in which an image to be displayed on the display is varied on the basis of the detected environment variation information and/or the date and time information.

7 Claims, 6 Drawing Sheets

DATA FOR FINE WEATHER

FIG. 4A
MORNING FRAME DATA

FIG. 4B
NOON FRAME DATA

FIG. 4C
EVENING FRAME DATA

FIG. 4D
NIGHT FRAME DATA

FIG.5A  FIG.5B  FIG.5C  FIG.5D  FIG.5E

FIG. 6A
NOON FRAME DATA

FIG. 6B
INTERMEDIATE PATTERN 1
(NOON4 : EVENING 1)

FIG. 6C
INTERMEDIATE PATTERN 2
(NOON3 : EVENING 2)

FIG. 6D
INTERMEDIATE PATTERN 3
(NOON2 : EVENING 3)

FIG. 6E
INTERMEDIATE PATTERN 4
(NOON1 : EVENING 4)

FIG. 6F
EVENING FRAME DATA

INFORMATION DISPLAY DEVICE FOR DISPLAYING VARIATION OF ENVIRONMENT

BACKGROUND OF THE INVENTION

The present invention relates to a display control device which is usable in various fields such as a computer information processing system, a multimedia information communication device, a broadcasting or reproducing video output device, etc., that is, in various systems having an image display function.

In general, a monitor display is provided as a constituent element of a system to display data to an user in each of various fields such as an information processing equipment, an information communication equipment, an information recording and reproducing equipment, an amusement equipment, etc. On the monitor, various display frames are displayed such as a menu frame using characters and icons, a control frame, etc., searched data, images, etc. The control frame is frequently displayed in a window mode.

In such a system, in some cases, a picture which is completely irrelevant to an actual work is displayed in addition to a display portion required for the actual work. Further, a display picture which is irrelevant to works is also displayed as a screen saver. However, an environmental picture that varies in connection with a real time has not been hitherto proposed as a display which is not directly associated with an actual work.

For example, if it is possible to display on the screen pictures representing an environmental variation of the surroundings or the outdoors on real-time basis when a user is immersed into a work while watching a screen of the monitor, it could be expected to make the user comfortable on even such an inorganic hardware and make the user feel the environmental variation. Therefore, an information display device which is capable of performing such a display operation has been required.

SUMMARY OF THE INVENTION

An object of the present invention is to provide an information display device which can perform a display operation in accordance with an actual time, and more particularly can display an environmental variation on real-time basis.

In order to attain the above object, an information display device according to the present invention includes a memory for storing image information which varies in time series, a display for displaying image information which is read out from the memory, a counter for counting date information and/or time information, an external environment variation detector for detecting the variation of an external environment, and a controller for changing image information to be read out from the memory on the basis of the date information and/or time information counted by the counter and the external environment variation detected by the external environment variation detector.

According to the information display device as described above, for example if image data corresponding to various environmental conditions of the sky at various time points such as morning, noon and evening are stored, and these data are switched to one another in accordance with the time, the user can have sense of time and feel as if he is surrounded by the nature with the artificially-produced environmental variation of the outdoors.

DETAILED DESCRIPTION OF THE PREFERRED EMBODIMENT

A preferred embodiment according to the present invention will be described with reference to the accompanying drawings.

An embodiment of a display control device to which the present invention is applied will be described with the reference to FIGS. 1 to 6.

The display control device of this embodiment is built in control unit of a multimedia system or the like, however, in order to simplify the description, only a functional block of the display control device will be described. Accordingly, the display operation contains data display which is an inherent action to the system, however, the description of the construction and the function thereof is omitted from the following description.

Figure 1:
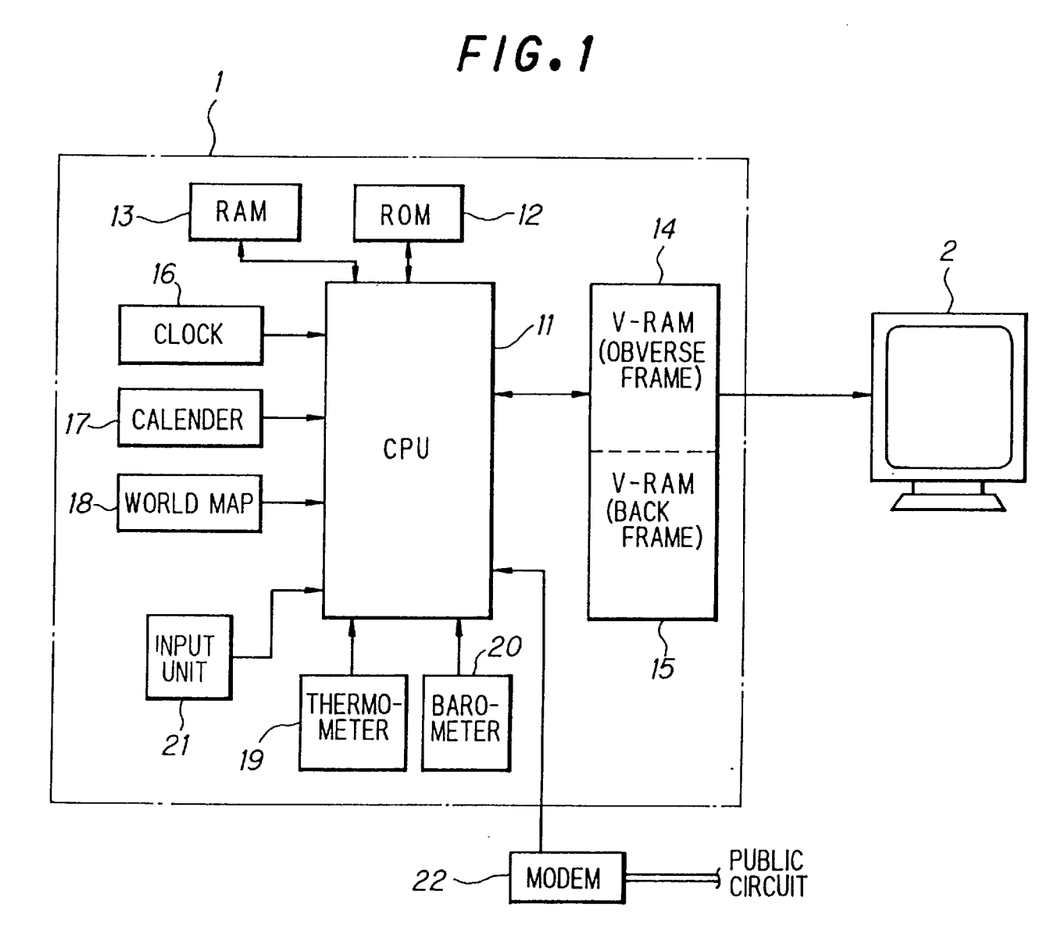
FIG. 1 is a block diagram showing a system to which the present invention is applied.

FIG. 1 is a block diagram showing the display control device.

The display control device 1 is constructed as a unit for supplying image data to be displayed to a monitor device 2. The display control device 1 includes a CPU 11 for controlling display output operation of various image data, a ROM (Read Only Memory) 12 for storing programs and various parameters to define the operation of the CPU 11, and a RAM (Random Access Memory) 13 which is used as a work area for various arithmetical and logical operations. As described later, various image data representing scenic images (pictures) corresponding to the morning, the noon, the evening, the night, etc. are stored in the ROM 12 or RAM 13.

A video RAM 14 is an area in which image data to be supplied to the monitor device 2 is formed. That is, the CPU 11 directly supplies image data formed on the video RAM 14 to the monitor device 2 so that the image data are displayed on the monitor 2.

A video RAM 15 is an area which is used to generate a frame on the video RAM 14, that is, to generate image data when a display image is changed. Specifically, when the display content is changed, image data after the change of the display content are beforehand generated on the video RAM 15, and the image data thus generated are copied to the video RAM 14, whereby the image data to be supplied to the monitor device 2 are changed.

In the following description, the video RAM 14 is referred to as "obverse-frame video RAM", and the video RAM 15 is referred to as "back-frame video RAM".

A counter unit 16 counts the present time, and supplies the counted present time information to the CPU 11. A calendar unit 17 counts the present year, month and date, and supplies the counted information on year, month and date to the CPU 11. Accordingly, the provision of the counter unit 16 and the calendar unit 17 in the CPU 11 enables the CPU 11 to grasp the present year, month, date, hour, minute and second at all times.

The display control device 1 is provided with a world map portion 18 and an input portion 21. The world map portion 18 is stored with data so that it can identify the latitude and longitude of an user's place in accordance with input information. For example, when an user inputs through the input portion 21 the name of a city where he is at present, the CPU 11 refers to the world map portion 18 to know the present position.

Further, the CPU 11 can also identify the latitude and longitude of the present position by beforehand storing map image data in the world map portion 18, and then allowing the user to point-indicate the present position through the input portion 21 in a state where a map image is displayed.

When the device is designed so that the user directly inputs information on the latitude and longitude through the input portion 21, the world map portion 18 is not necessarily required.

The display control device 1 is further provided with a thermometer unit 19 and a barometer unit 20, and the CPU 11 receives information from the thermometer unit 19 and the barometer unit 20 to identify a weather condition around the display control device.

The thermometer unit 19 and the barometer unit 20 are preferably disposed at the outside of the display control device, and it is more preferable that they are disposed out of a room where this system is disposed (for example, in a garden) if possible so that the outdoor temperature and pressure condition can be measured.

Further, the CPU 11 is connected through a modem 22 to a general communication line such as an ISDN line or the like. If the system is designed to access weather information of an area through the communication line, the thermometer unit 19 and the barometer unit 20 are not necessarily required.

Figure 2:
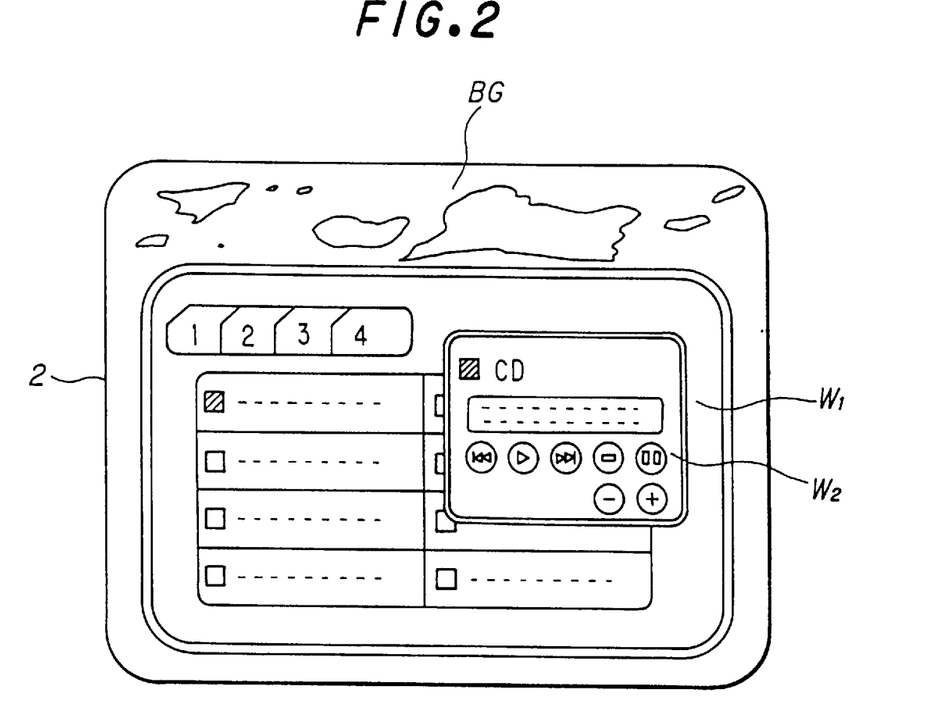
FIG. 2 shows a display example on a display to which the present invention is applied.

FIG. 2 shows a display state which can be achieved by the display control device 1 of this embodiment.

In general, a control frame, a menu frame, etc. are displayed as windows W1 and W2 on the screen of the monitor device 2 of FIG. 1. According to the display control device 1 of this embodiment, in addition to the above displays, a scene where clouds drift away in the sky can be displayed as a background image (BG) in a frame area which is not associated with the above displays as shown in FIG. 2.

According to this embodiment, a group of four image data containing morning frame data, noon frame data, evening frame data and night frame data are stored as background images (GB) in the ROM 12.

The group is defined as a data group which comprises data of the morning, data of the noon, data of the evening and data of the night under each of various weather conditions, and thus various groups are provided in accordance with the weather condition. For example, morning frame data, noon frame data, evening frame data and night frame data as shown in FIGS. 4A to 4D are provided as a data group under fine weather (hereinafter referred to as "fine-weather data group").

For the fine-weather data group, the morning frame data, the noon frame data and the evening frame data are set so that clouds drift in the clear sky and the color of the sky is set to the morning glow color, blue color and the evening glow color respectively (these colors cannot be represented in the figures). The night frame data are set so that the color of the sky is set to be dark and the moon and stars are drawn on the frame, for example.

In addition to the fine-weather data group, rainy-weather data group and snowfall data group are provided as image data groups, and image data representing four types of scenes such as a morning, noon, evening and a night scene are provided to each of the above groups. Further, there may be prepared various data groups each of which is matched to a weather condition (such as typhoon data group, cloud-weather data group, etc.), and contains four types of image data which vary in accordance with time lapse.

As described above, there are prepared four types of image data (morning image data, noon image data, evening image data and night image data). However, the image data may further be finely divided, or it may be set to only two types as noon image data and night image data.

As described above, various types of image data are prepared in the ROM 12, and the CPU 11 achieves a display like a background image BG as shown in FIG. 2 in accordance with the time or the weather condition.

Next, the display control operation of the background image BG by the CPU 11 will be described.

First, with respect to the image data groups used for the display of the background image, each of the various image data is selected from the ROM 12 on the basis of the measurement information supplied from the thermometer unit 19 and the barometer unit 20 or the weather information which is supplied through the modem 22. The most suitable (optimum) image data group is determined in accordance with the current weather condition (temperature/pressure), and the determined image data group is set for a background image display.

The concrete display control of CPU 11 on the assumption that the current weather is fine and thus the fine-weather data group is selected will be described hereunder.

The CPU 11 sets therein the following four special display switch times (first to fourth switch times $T_{NO}$, $T_{EV}$, $T_{NI}$ and $T_{MO}$) for every data. At first time $T_{NO}$, the display is switched from the morning scene to the noon scene, at a time $T_{EV}$ the display is switched from the noon scene to the evening scene, at a time $T_{NI}$ the display is switched from the evening scene to the night scene, and at a time $T_{MO}$ the display is switched from the night scene to the morning scene.

Each of the display switch times $T_{NO}$, $T_{EV}$, $T_{NI}$ and $T_{MO}$ is set on the basis of the present date and time or season and an area (latitude and longitude) where the system is disposed. That is, considering that sun-rise and sun-set times are varied in accordance with the season or the latitude and longitude, the display of these scenes is performed to be matched to the environmental variation of the area. The CPU 11 calculates the sun-rise and sun-set times on the basis of the date and time information detected from the calendar 17 and the latitude and longitude of the area which can be specified from positional information input by the user and the world map portion 18, and sets the display switch times $T_{NO}$, $T_{EV}$, $T_{NI}$ and $T_{MO}$ on the basis of the calculation result.

Figure 3:
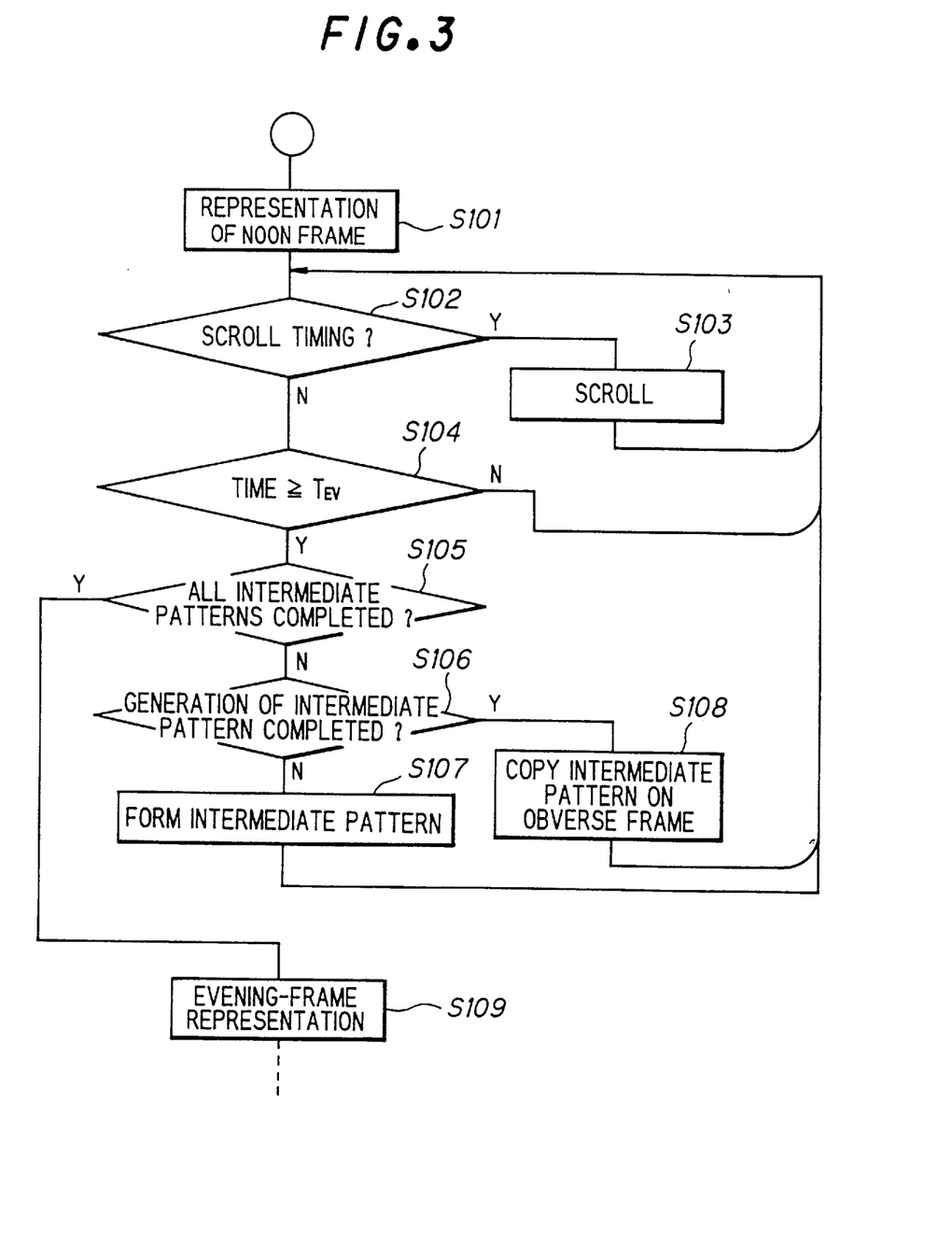
FIG. 3 is a flowchart for controlling a display frame on a display according to the present invention.

FIG. 3 is a flowchart for the processing flow of the CPU 11 which is performed at the display operation time on the basis of the selection of an optimum image data group in accordance with a weather condition and the setting of the display switch times $T_{NO}$, $T_{EV}$, $T_{NI}$ and $T_{MO}$.

Figure 4A:
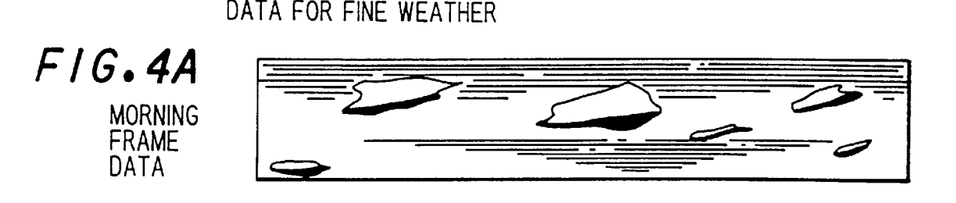
FIG. 4A is a display example at a time around the morning in fine weather to be displayed on a display.
Figure 4B:
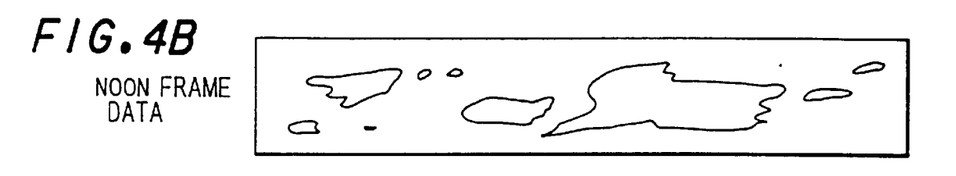
FIG. 4B is a display example at a time around the noon in fine weather to be displayed on the display.

In FIG. 3, the processing flow of the display operation of the CPU 11 is illustrated as starting from step S101 in which the noon frame (scene) is displayed. That is, when the present time is a time in the day and it is going to reach the display switch time $T_{EV}$, the CPU 11 controls a display BG (background image display) with noon frame data as shown in FIG. 4B.

In this case, an image scroll is performed by shifting the noon frame data, for example, dot by dot in a predetermined direction at a processing timing of timer interruption processing or the like on the program. This processing is shown as steps S102 and S103.

Figure 5A:
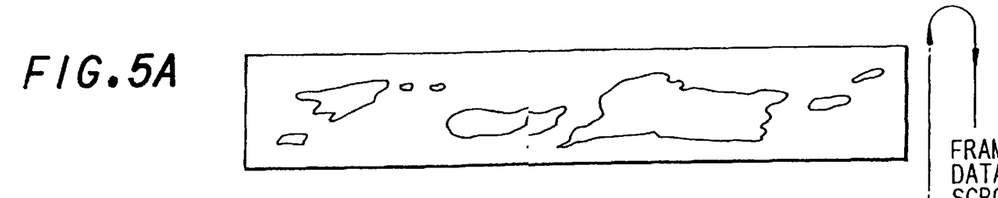
FIGS. 5A to 5E are diagrams showing the transition (variation) of clouds to be displayed on the display.

For example, the noon frame data are transferred to the obverse frame video RAM 14 to display an image shown in FIG. 5A like the display BG of FIG. 2. Thereafter, data obtained by shifting the image data of FIG. 5A by one dot are beforehand generated in the back frame video RAM 15, and the image data thus obtained on the back frame video RAM 15 are copied into the obverse frame video RAM 14 at a scroll timing in step S102. With this processing, the one-dot shifted noon frame data are displayed.

Figure 5B:
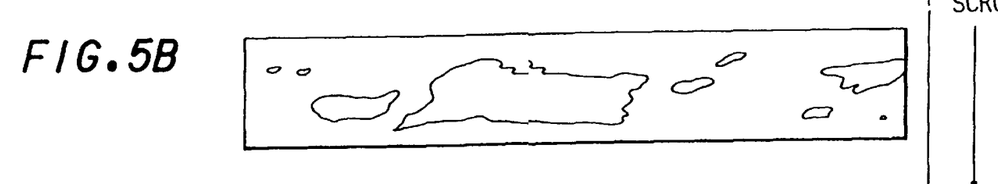
Figure 5C:
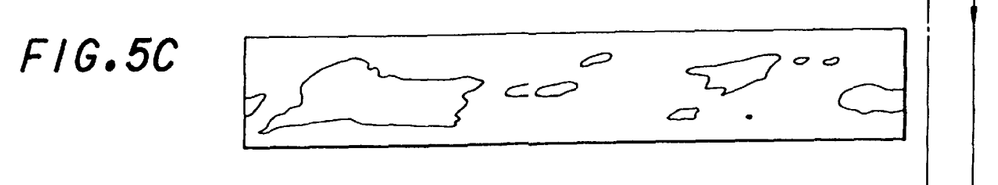
Figure 5D:
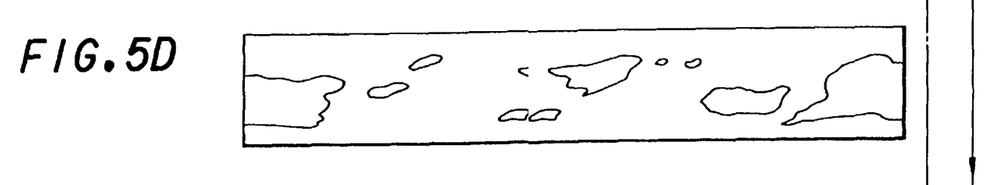
Figure 5E:
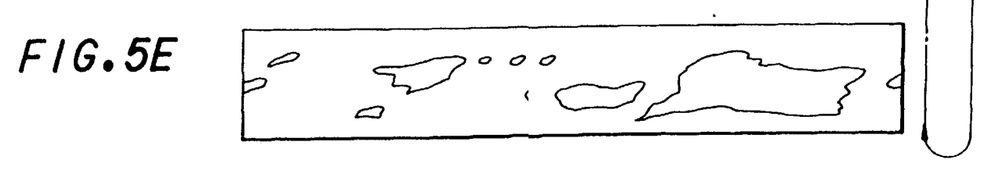

This processing is carried out at each timer interruption timing, whereby the image is varied in an order of FIG. 5A →FIG. 5B →FIG. 5C →FIG. 5D →FIG. 5E →FIG. 5A →FIG. 5B ..., that is, such a scene that clouds drift in the sky is represented on the monitor device 2.

Subsequently, if the time counted by the timer unit 16 reaches the display switch time $T_{EV}$ (for example, at 6 p.m.) at which the noon frame should be changed to the evening frame during the display of the noon frame while the noon frame is displayed, the process of the CPU 11 goes from S104 to steps S105 and 105.

Figure 4C:
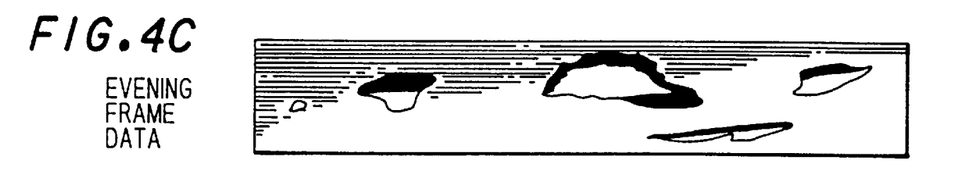
FIG. 4C is a display example at a time around the evening in fine weather to be displayed on the display.
Figure 4D:
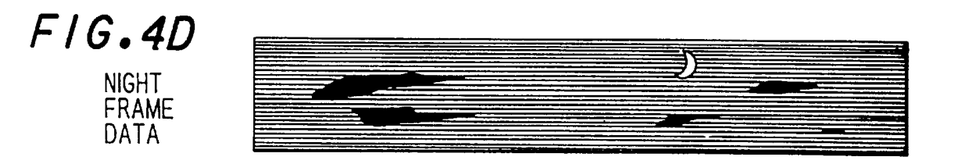
FIG. 4D is a display example at a time around the night in fine weather to be displayed on the display.

In the present invention, it is unnatural that the displayed current image data (noon frame data) are suddenly switched to the evening frame data shown in FIG. 4C at the time $T_{EV}$. Therefore, according to the present invention, these frame data are gradually switched to each other while intermediate patterns (1) to (4) as shown in FIGS. 6B to 6D are generated as display frames representing a time lapse by using the noon frame data shown in FIG. 4B and the evening frame data shown in FIG. 4C.

For example, when the present time reaches the time $T_{EV}$, the process first goes to step S107 to combine the noon frame data and the evening frame data in a predetermined ratio to generate or synthesize the intermediate pattern (1). This generation processing is performed in the back frame video RAM 15. For example, the intermediate pattern (1) is generated by combining the noon frame data and the evening frame data in a ratio of 4:1.

At the time when the intermediate pattern (1) has been completely generated, the process goes to step S106 to S108 to copy the image data of the intermediate pattern (1) into the obverse frame video RAM 14. Accordingly, an image shown in FIG. 6B is displayed as a background image BG on the monitor device 2, and this image is scrolled through the processing of the steps S102 and S103.

While the intermediate pattern (1) is subjected to the scroll processing as described above, the process goes to steps S104, S105, S106 and S107 in the intervals of the scroll processing to generate a next intermediate pattern (2).

The intermediate pattern (2) is generated by combining the noon frame data and the evening frame data, for example, in a ratio of 3:2 to generate image data shown in FIG. 6C. At the time when the intermediate pattern (2) has been completely generated, the process goes from step S106 to S108 to copy the image data of the intermediate pattern (2) into the obverse frame video data RAM 14. Accordingly, an image shown in FIG. 6C is displayed as a background image BG on the monitor device 2, and this image is scrolled through the processing of the steps S102 and S103.

If the copy processing in step S108 is carried out at a timing at which the scroll-displayed image is returned to its scroll-starting position (i.e., the scroll cycle is performed just several times), the display variation is made smooth, so that a natural environmental variation can be represented.

Thereafter, the intermediate pattern (3) shown in FIG. 6D is generated by combining the noon frame data and the evening frame data in a ratio of 2:3 while the intermediate pattern (2) is scrolled, and at the time when the intermediate pattern (3) has been completely generated, it is copied into the obverse frame video RAM 14 in step S108. Thereafter, the process goes to a step in which the intermediate pattern (3) is displayed in a scroll mode.

Figure 6A:
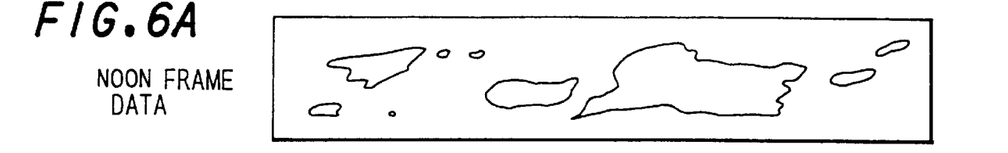
FIG. 6A is a display example at noon in weather condition on the display.
Figure 6B:
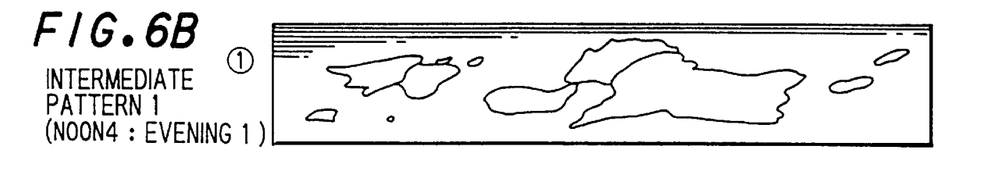
FIG. 6B is a display example of an intermediate pattern having a ratio of 4(noon):1(night) when the display is changed from the noon display to the evening display in fine weather.
Figure 6C:
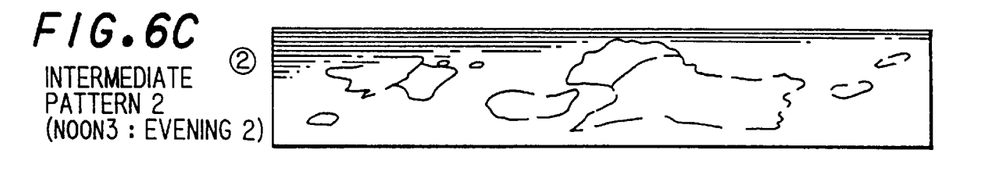
FIG. 6C is a display example of an intermediate pattern having a ratio of 3(noon):2(night) when the display is changed from the noon display to the evening display in fine weather.
Figure 6D:
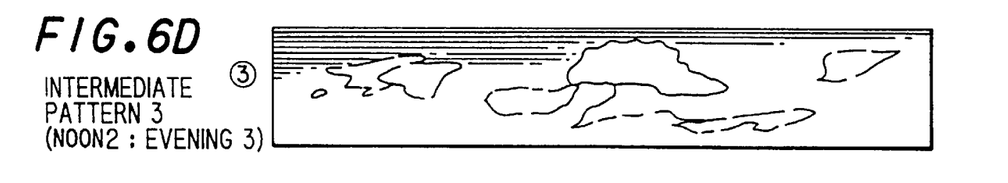
FIG. 6D is a display example of an intermediate pattern having a ratio of 2(noon):3(night) when the display is changed from the noon display to the evening display in fine weather.
Figure 6E:
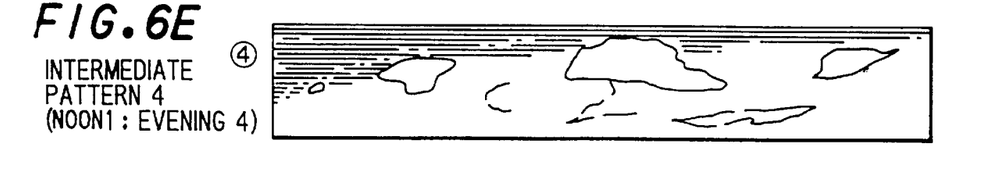
FIG. 6E is a display example of an intermediate pattern having a ratio of 1(noon):4(night) when the display is changed from the noon display to the evening display in fine weather.

Thereafter, the intermediate pattern (4) shown in FIG. 6E is generated by combining the noon frame data and the evening frame data in a ratio of 1:4 while the intermediate pattern (3) is scrolled, and at the time when the intermediate pattern (4) has been completely generated, it is copied into the obverse frame video RAM 14 in step S108. Thereafter, the process goes to a step in which the intermediate pattern (4) is displayed in a scroll mode.

In the above description, the four types of intermediate patterns (1) to (4) are prepared to simplify the description. In this case, at the time when the scroll of the intermediate pattern (4) is repeated at several display cycles, the display of the intermediate pattern is finished and then the process goes from step S105 to S109 to copy into the obverse frame video RAM 14 the evening frame data which are originally stored in the ROM 12, and then the evening frame data are subjected to the scroll display as described above.

Figure 6F:
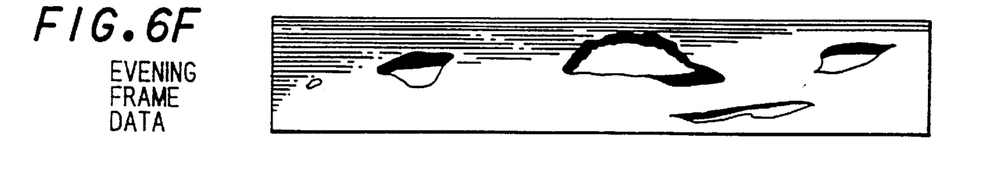
FIG. 6F is a display example when the display has been changed to the evening display in fine weather.

As described above, when the present time reaches the switch time $T_{EV}$ at which the display is switched from the noon frame display to the evening frame display, the display is gradually switched from the display of FIG. 6A to the display of FIG. 6F. For example, at 6 p.m., the display is gradually varied from the noon frame display of FIG. 6A while the scene in the sky is increasingly colored with red, and at 6:30, the display is varied to the scroll-displayed evening frame display in which the evening scene in the sky is scrolled.

The number of intermediated patterns thus generated and the display period of each intermediate pattern may be set such that the combined or synthesized images are matched to scenes in the sky at actual times.

Subsequently to the time when the evening frame display is started in step S109 of FIG. 3, the scroll of the evening frame data is continued until the time reaches the display switch time $T_{NI}$ at which the display is switched from the evening frame display to the night frame display. Subsequently to the time $T_{NI}$, the evening frame display is changed to the night frame display in the same processing as shown in FIG. 3. That is, various intermediate patterns are generated on the basis of the evening frame data and the night frame data, and the respective intermediate pattern images are displayed one after another. The displayed scene is gradually varied while matched to the actual time until the display is finally changed to the night frame display.

The same processing as described above is performed when the night frame display is switched to the morning frame display, and when the morning frame display is switched to the noon frame display.

The above displays are representatively described on the assumption that the fine-weather data group is displayed. However, the same display processing is performed when the image data of the rainy-weather, the snowfall data group or the like are displayed.

According to the present invention, the user can feel as if he is surrounded by the nature even with an inorganic hardware, and also he can grasp outdoor scenes, weather and time even when he is in a room.

Further, the display variation can be made smooth by using the intermediate patterns as described above, so that the user can work with a sense of natural time lapse. In addition, the number of the display patterns of image data to be stored in the ROM 12 can be minimized to four patterns for a day by combining the respective image data into the intermediate patterns, so that the storage capacity can be saved.

Still further, the scroll of the display scene enables the displayed image itself to serve as a screen saver to protect any printing on the screen.

In the above embodiment, the image to be displayed is set to the sky scene as described above. However, the present invention is not limited to the sky scene, and various scenes may be adopted. For example, several patterns may be provided for each of the scene of the seashore, the scene of the green, the scene of mountains, the scene of cities, etc. in accordance with the times of a day to display each of these patterns in the same manner as described above.

Further, as the night scene, the waxing and waning of the moon, constellations, movements thereof, etc. may be displayed in accordance with season, period or time.

It is needless to say that the construction and the display processing of the display control device of the present invention is not limited to those of FIGS. 1 and 3, and various other constructions and display processing may be adopted. Further, the display control device of the present invention is applicable to any system using a monitor device.

As described above, according to the display control device of the present invention, the image data corresponding to various time points such as the morning, the noon, the evening, the night, etc. are stored, and when the time reaches a predetermined display switch time, the image data which are output from the image output means are switched so that the image to be displayed is matched to the environmental condition at that time. Therefore, the user can have sense of time and feel as if he is surrounded by the nature with the artificially-produced environmental variation of the outdoors on the screen, and thus the user is made comfortable even when he uses an inorganic hardware.

Further, by gradually switching the display frame with the synthesized image data, more natural scene representation (display) can be performed. In addition, the data amount to be stored can be minimized. The setting of the switch time is performed on the basis of the calendar information and the positional information, and the used image data are selected in accordance with the weather information, whereby the more accurate environmental representation can be performed.

Still further, the pictures which are displayed on the screen can also be used as a screen saver.

What is claimed is:

1. An information display device for displaying environmental conditions as a background screen image, said device comprising:

first memory means for storing sets of image data respectively related to scenes at a plurality of preselected times of day under at least one set of preselected weather conditions;

second and third memory means, said second memory means generating successive frame data as a function of at least one of the sets of image data and copying the successive frame data to said third memory means;

display means for displaying the successive frame data as a background image, the display means being configured to selectively superimpose at least one additional image on the background image;

date and time information detecting means for detecting date and time information;

external environmental variation detecting means for detecting variation of an external environment; and control means, responsive to the first memory means, configured to control the generation of the successive frame data by combining the sets of image data in a combination selected in real-time as a function of the date and time information detected by said date and time information detecting means, a location of the information display device, and a real-time variation of the external environment, the selected combination relating to a time of day intermediate between the preselected times of day.

2. The information display device as claimed in claim 1, wherein said external environment variation detecting means detects information which is supplied through a communication line.

3. The information display device as claimed in claim 1, wherein said external environment variation means detects at least one of air pressure, air temperature and air humidity.

4. The information display device as claimed in claim 1, wherein the background image is gradually switched between morning frame data, noon frame data, evening frame data, and night frame data stored in the first memory means, with a plurality of intermediate patterns being successively displayed in accordance with said date and time information, said location of the information display device, and said real-time variation of the external environment so that when a predetermined switch time is reached, the background image represents environmental conditions at said predetermined switch time.

5. The information display device as claimed in claim 1, wherein the background image is displayed as a screen saver.

6. In an information system, an information display device for displaying environmental conditions as a background screen image not directly associated with an actual work, said device being built in a control unit of said information system and comprising:

first memory means for storing sets of image data respectively related to scenes at a plurality of preselected times of day under at least one set of preselected weather conditions;

second and third memory means, said second memory means generating successive frame data as a function of at least one of the sets of image data and copying the successive frame data to said third memory means;

display means for displaying the successive frame data as a background image, the display means being configured to selectively superimpose at least one additional image on the background image;

date and time information detecting means for detecting date and time information;

external environmental variation detecting means for detecting real-time variation of an external environment; and control means, responsive to the first memory means, configured to control the generation of the successive frame data by combining the sets of image data in a combination selected in real-time as a function of the date and time information detected by the date and time information detecting means, a location of the information system, and a real-time variation of the external environment, the selected combination relating to a time of day intermediate between the preselected times of day, said background image being gradually switched between morning frame data, noon frame data, evening frame data, and night frame data stored in the first memory means, with a plurality of intermediate patterns being successively displayed in accordance with said date and time information, the location of the information system, and said real-time variation of the external environment so that when a predetermined switch time is reached, the background image represents environmental conditions at the location of the information system at said predetermined switch time.

7. The information system information display device as claimed in claim 6, wherein the background image is displayed as a screen saver.

* * * * *